US011506159B1

(12) United States Patent
Rillie, Jr. et al.

(10) Patent No.: US 11,506,159 B1
(45) Date of Patent: Nov. 22, 2022

(54) DUAL FUEL TANK SYSTEM WITH INTERNALLY MOUNTED FUEL TANKS IN LINE WITH ACTUATORS

(71) Applicant: Caterpillar Inc., Peoria, IL (US)

(72) Inventors: Hugh Rillie, Jr., Cary, NC (US); Sean W. Thompson, Fuquay-Varina, NC (US); Jason Alan Mahoney, Moncure, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/385,171

(22) Filed: Jul. 26, 2021

(51) Int. Cl.
*F02M 37/00* (2006.01)
*F02M 37/10* (2006.01)
*F02M 37/50* (2019.01)
*B60K 15/03* (2006.01)

(52) U.S. Cl.
CPC ...... *F02M 37/0088* (2013.01); *F02M 37/103* (2013.01); *F02M 37/50* (2019.01); *B60K 2015/03118* (2013.01)

(58) Field of Classification Search
CPC .. F02M 37/0088; F02M 37/103; F02M 37/50; B60K 2015/03118
See application file for complete search history.

(56) References Cited

U.S. PATENT DOCUMENTS

| 842,491 | A | 1/1907 | Reed |
| 6,550,811 | B1 | 4/2003 | Bennett et al. |
| 10,858,803 | B2 | 12/2020 | Durkin et al. |
| 2020/0070647 | A1 | 3/2020 | Roske et al. |
| 2020/0108714 | A1* | 4/2020 | Selvaraj ............... B60K 15/067 |

FOREIGN PATENT DOCUMENTS

| CN | 203 11341 | | 8/2013 | |
| CN | 211773979 | | 10/2020 | |
| JP | 4281211 | B2 | 6/2009 | |
| WO | WO-2020059334 | A1 * | 3/2020 | ............. B60K 15/03 |

\* cited by examiner

*Primary Examiner* — Jacob M Amick
*Assistant Examiner* — Charles J Brauch
(74) *Attorney, Agent, or Firm* — Lee & Hayes, P.C.

(57) ABSTRACT

A machine includes an engine compartment, an engine located within the engine compartment, a first compartment located on a first side of the machine, external to the engine compartment, and accessible via the engine compartment, as well as a second compartment located on a second side of the machine, external to the engine compartment, and accessible via the engine compartment. A first actuator is disposed on the first side of the machine and couples to a first linkage member that supports a work implement. A second actuator is disposed on the second side of the machine and couples to a second linkage member that supports the work implement. A first fuel tank is located in the first compartment, coplanar with the first actuator. A second fuel tank is located in the second compartment, coplanar with the second actuator.

20 Claims, 9 Drawing Sheets

DUAL FUEL TANK SYSTEM WITH INTERNALLY MOUNTED FUEL TANKS IN LINE WITH ACTUATORS

TECHNICAL FIELD

The present disclosure relates to a fuel tank system of a machine. More particularly, the present disclosure relates to a dual fuel tank system for a compact heavy-duty application machine, where the tanks of the dual fuel tank system are located in line with actuators of the machine.

BACKGROUND

Fuel tanks store fuel that is used to power machinery. On existing machines, the fuel tanks may be located under engine and/or in compact enclosures, such as an engine bay. In such designs, servicing and cleaning the engine and other components presents challenges. Additionally, given space constraints, the fuel tanks may include complex geometries. Also, the fuel tanks may lack sufficient storage capabilities if the engine is required to operate for extended hours. Additionally, such complex geometries often result in fuel tank designs that do not adequately provide fuel in varying and rugged terrain.

One attempt to overcome the aforementioned deficiencies is described in Japanese Patent Number 4,281,221 (hereinafter the "'221 reference"). The '221 reference contemplates fuel tanks located on left and right sides of a transmission case of a tractor, below a floor of the tractor. A connecting hose of the '221 reference connects the fuel tanks, such that on uneven surfaces, fuel is accumulated at the lowest position and supplied to an engine (or from a lower of the fuel tanks). The fuel tanks of the '221 reference are also externally mounted to the tractor. However, the externally-mounted fuel tanks of the '221 reference are not suited for use within compact machine enclosures and, as a result, such fuel tanks enlarge the footprint of the machines on which they are used. Additionally, the externally-mounted fuel tanks described in the '221 reference are susceptible to possible damage in forestry sites, waste sites, recycling sites, demolition sites, construction sites, and other relatively harsh work environments. As a result, such fuel tanks can cause safety and reliability concerns when employed in these environments.

The present disclosure is in part directed to overcoming one or more of the deficiencies described above.

SUMMARY

In an aspect of the present disclosure, a fuel system comprising a first fuel tank configured to reside within a first compartment of a machine, the first compartment located between a first actuator of the machine and a rear of the machine, a second fuel tank configured reside within a second compartment of the machine, the second compartment located between a second actuator of the machine and the rear of the machine, a fluid release component fluidly connected to at least one of a top portion of the first fuel tank or a top portion of the second fuel tank, the fluid release component being configured to vent fluid within the at least one of the first fuel tank or the second fuel tank, and a fluid line fluidly connecting a bottom portion of the first fuel tank with a bottom portion of the second fuel tank, the fluid line being configured to transfer fuel between the first fuel tank and the second fuel tank.

In another aspect of the present disclosure, a machine comprising an engine compartment, an engine located at least partially within the engine compartment, a first compartment located on a first side of the machine, external to the engine compartment, a second compartment located on a second side of the machine, external to the engine compartment, a first actuator disposed on the first side of the machine, the first actuator being coupled to a first linkage member configured to support a work implement, a second actuator disposed on the second side of the machine, the second actuator being coupled to a second linkage member configured to support the work implement, a first fuel tank located at least partially within the first compartment, the first fuel tank being intersected by a same vertical plane as the first actuator, and a second fuel tank located at least partially within the second compartment, the second fuel tank being intersected by a same vertical plane as the second actuator.

In yet another aspect of the present disclosure, a machine comprising an engine compartment, an actuator coupled to a linkage member configured to support a work implement, a compartment located on a side of the engine compartment and accessible via the engine compartment, and a component at least partially disposed within the compartment, the component being coplanar with the actuator and the linkage member.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The devices and systems depicted in the accompanying figures are not to scale and components within the figures may be depicted not to scale with each other.

DETAILED DESCRIPTION

Figure 1:
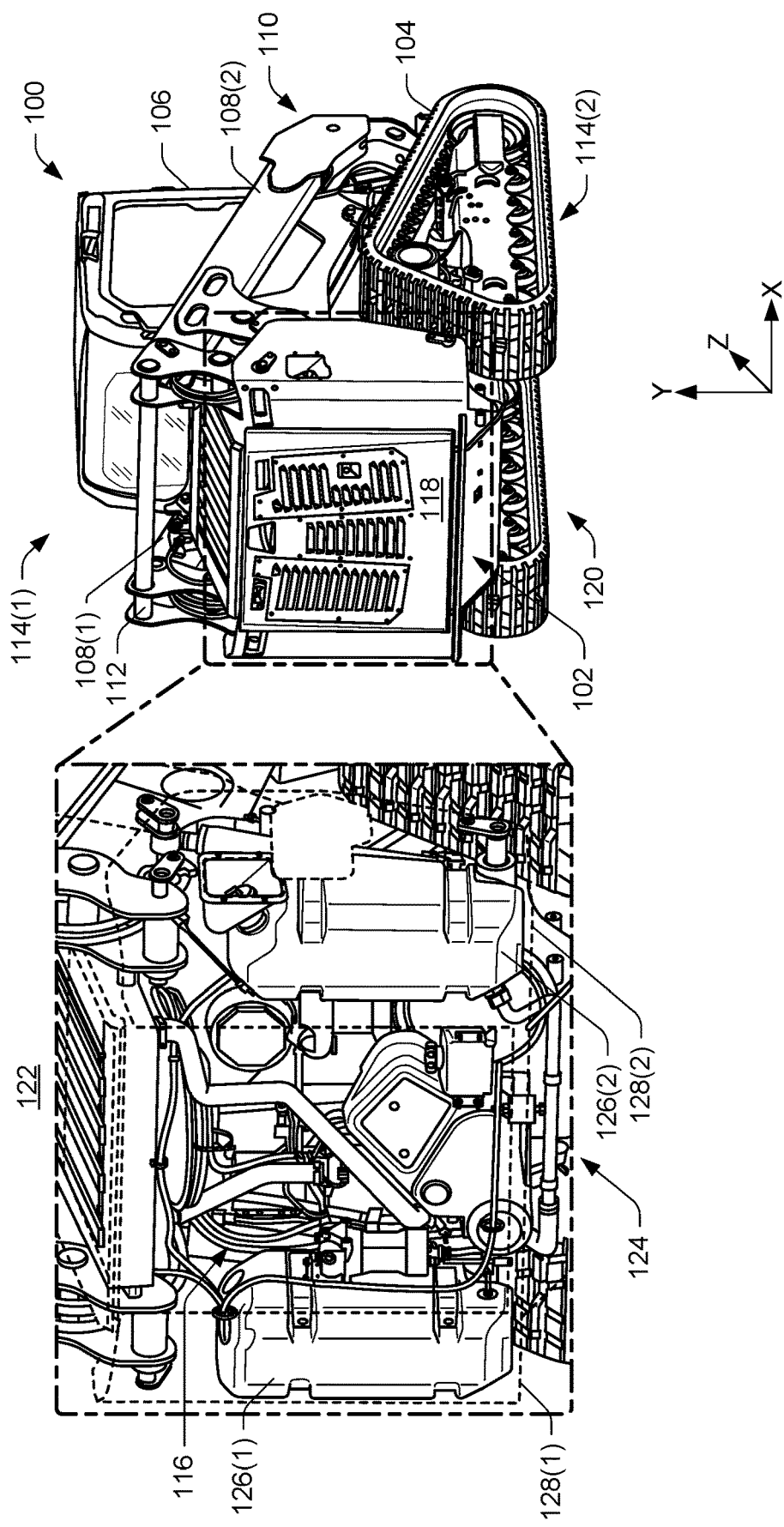
FIG. 1 is a side perspective view of a machine having a dual fuel tank system, according to an embodiment of the present disclosure.

FIG. 1 illustrates a machine 100. As shown, the machine 100 is embodied in the form of a compact tractor or machine, such as a skid steer. However, in other embodiments, the machine 100 may embody a loader, a plow, a dozer, an excavator, and/or the like. The machine 100 includes a frame 102 having ground engaging members 104, for example, tracks rotatably supported thereon. However, in other embodiments, the ground engaging members 104 may include wheels. The machine 100 further includes an operator cabin 106 within which an operator of the machine 100 may control the machine 100 (e.g., using interfaces, controls, joystick, and so forth located in operator cabin 106).

The machine 100 includes linkage members 108 that are configured to support a work implement (not shown) disposed at a front 110 of the machine 100. Example work implements include buckets, blades, forks, grapples, tillers, and so forth. As discussed in detail in regard to FIGS. 5 and 7, the linkage members 108 couple to the frame 102 at hinge points, such as via brackets, flanges, and so forth. For example, ends of the linkage members 108 may pivot about the hinge points for raising and lowering the linkage members 108 (and therefore, the work implement). Additionally, as also discussed in detail herein, one or more actuators (e.g., hydraulic cylinders, pneumatic cylinders, etc.) connect to the linkage members 108 for raising and lowering work implements coupled to the linkage members 108. The one or more actuators are operable by the operator of the machine 100 within the operator cabin 106, for example. In such instances, the linkage members 108 and the frame 102 may include structures through which a pin is placed for hingedly coupling the linkage members 108 and the frame 102. A crossbar 112 may couple the linkage members 108 to another. As shown, the linkage members 108 may include a first linkage member 108(1) disposed on a first side 114(1) of the machine 100 (e.g., left side) and a second linkage member 108(2) disposed on a second side 114(2) of the machine 100 (e.g., right side).

The machine 100 also has an engine compartment 116 (e.g., engine bay) that is supported on the frame 102, towards a rear 120 of the machine 100. The engine compartment 116 may be accessible via a door 118 coupled to the frame 102. A detailed and enlarged view 122 of the engine compartment 116 and the rear 120 of the machine 100 is shown in FIG. 1. Portions of the frame 102 are shown as transparent in the detailed and enlarged view 122 to illustrate components of the machine 100, or components disposed at least partially within, or accessible within, the engine compartment 116. For example, the engine compartment 116 may be configured to enclose an engine and other components that are typically associated as part of a drive system with the engine. For example, the engine compartment 116 may include pump(s) (e.g., hydraulic), filter(s) (e.g., oil, air, etc.), transmission(s), radiator(s), and so forth.

The machine 100 also includes a fuel system 124, which in some instances, comprises a pair of fuel tanks 126, such as a first fuel tank 126(1) and a second fuel tank 126(2). The fuel tanks 126 are disposed on sides of the machine 100, external to the engine compartment 116. In other words, the fuel tanks 126 may not occupy a space, area, or volume corresponding to the engine compartment 116. Instead, the fuel tanks 126 may reside within compartments, spaces, or areas that are separate from the engine compartment 116. For example, as discussed herein in detail with respect to at least FIGS. 5 and 7, the frame 102 or a body of the machine 100 may define compartments within which the fuel tanks 126 are disposed. On the machine 100, the fuel tanks 126 may be disposed externally beneath covers coupled to the frame 102. In some instances, externally to the machine 100 may mean external to the engine compartment 116. A first cover 128(1) may be disposed over the first fuel tank 126(1) and a second cover 128(2) may be disposed over the second fuel tank 126(2). The first cover 128(1) and the second cover 128(2) are shown as transparent in the detailed and enlarged view 122. The fuel tanks 126 may be accessible via the engine compartment 116 and opening of the door 118. That is, the fuel tanks 126 may reside in their own respective compartments, or spaces, but may be accessible from within the engine compartment 116. However, in some instances, the fuel tanks 126 may reside at least partially in the compartments and/or at least partially within the engine compartment 116.

The first fuel tank 126(1) is shown disposed on the first side 114(1) of the machine 100, and the second fuel tank 126(2) is shown disposed on the second side 114(2) of the machine 100. As discussed herein in more detail with regard to FIGS. 2 and 3, the fuel tanks 126 may in part be disposed in line, or on a same plane ("coplanar"), as a portion of the one or more actuator(s) connected to the to the linkage members 108. For example, the first fuel tank 126(1) may be aligned in the same vertical plane (Y-Z plane with reference to the Cartesian Coordinate System) as a first actuator coupled to the first linkage member 108(1), and the second fuel tank 126(2) may be aligned in the same vertical plane (Y-Z plane with reference to the Cartesian Coordinate System) as a second actuator coupled to the second linkage member 108(2). For example, in some instances, a centerline of the first fuel tank 126(1) and a centerline of the first actuator may be horizontally aligned, and/or a centerline of the second fuel tank 126(2) and a centerline of the second actuator may be horizontally aligned. Moreover, the first fuel tank 126(1) may be disposed between (in the Z-direction) the first actuator coupled to the first linkage member 108(1) and the rear 120 of the machine 100, and/or the second fuel tank 126(2) may be disposed between (in the Z-direction) the second actuator coupled to the second linkage member 108(2) and the rear 120 of the machine 100.

The space occupied by the fuel tanks 126 may be provided at least in part by positioning the actuators coupled to the linkage members 108 forward from the rear 120. Discussed in more detail with regard to FIGS. 4 and 6, the actuators include a pivot and lift position that is spaced apart from the rear 120 of the machine 100. This moves the actuators forward, towards the front 110, and provides a space in which the fuel tanks 126 may reside. Additionally, the forward positioning of the actuators limits fore and aft motion as the actuators extend to lift the linkage members 108. As a result, a space is created for positioning the fuel tanks external to the engine compartment 116.

As shown, the fuel tanks 126 may include an elongated shape (Y-direction). A height of the fuel tanks 126 (Y-direction) may be greater than a width (X-direction) and/or a depth (Z-direction) of the fuel tanks 126. The shape of the fuel tanks 126 ensures that, in uneven terrain and/or low fuel conditions, enough head pressure is provided to supply fuel to a fuel pump. Comparatively, fuel tanks that are wider and/or deeper, with lower heights, may result in the fuel pump being unable to intake fuel on uneven terrain (as the fuel shifts within the fuel tanks) and/or low fuel conditions. Such design may also increase a fuel capacity of the machine 100, for example, being as the fuel tanks 126 are not restricted to being disposed within the engine compartment 116. The fuel tanks 126 of the present disclosure are configured to prevent such instances of inability to supply fuel through their shape, configuration, and location on the machine 100.

Furthermore, locating the fuel tanks 126 on either side of the engine, or on opposite sides of the engine compartment 116, permits the engine to be lowered (vertically in the Y-direction) on the machine 100, thereby lowering the center of gravity (CoG) of the machine 100 and increasing machine stability. Additionally, the fuel tanks 126 may be more easily accessed for cleaning, repairing, refueling, and so forth. Although discussed as including two fuel tanks, the machine 100 may include a single fuel tank, or more than two fuel tanks 126. Moreover, rather than one or both of the fuel tanks 126 residing between the actuator and the rear 120, other components may take the place of the fuel tank(s) 126. For example, batteries, pump(s), filter(s) etc. may be located in line with the actuator(s) and/or the linkage members 108 on the sides of the machine 100, respectively.

In instances where the machine 100 includes two fuel tanks 126, the fuel tanks 126 may be fluidly connected to one another via various hoses, fluid lines, and so forth. Additional details of one or more hoses, for example, fluidly connecting the fuel tanks 126 are discussed in detail in regard to FIGS. 8 and 9. Additionally, in some examples a fuel pump is configured to draw fuel from a hose fluidly coupling the fuel tanks 126 and for supplying fuel to the engine.

The machine 100 therefore includes the fuel system 124 having fuel tanks that are located on opposite sides of the machine 100. For example, the fuel tanks 126 may be located within compartments located on sides of the machine 100, which are in line with the linkage members 108 and/or actuators of the machine 100. Such compartments may be permitted given that the actuators are spaced apart from the rear 120 of the machine 100, towards the front 110. In other words, moving the actuators forward, towards the front 110, provides space occupied by the fuel tanks 126 and permits the fuel tanks 126 to be located external to the engine compartment 116. In doing so, the fuel tanks 126 may include simple geometries and may free up space within the engine compartment 116.

Figure 2:
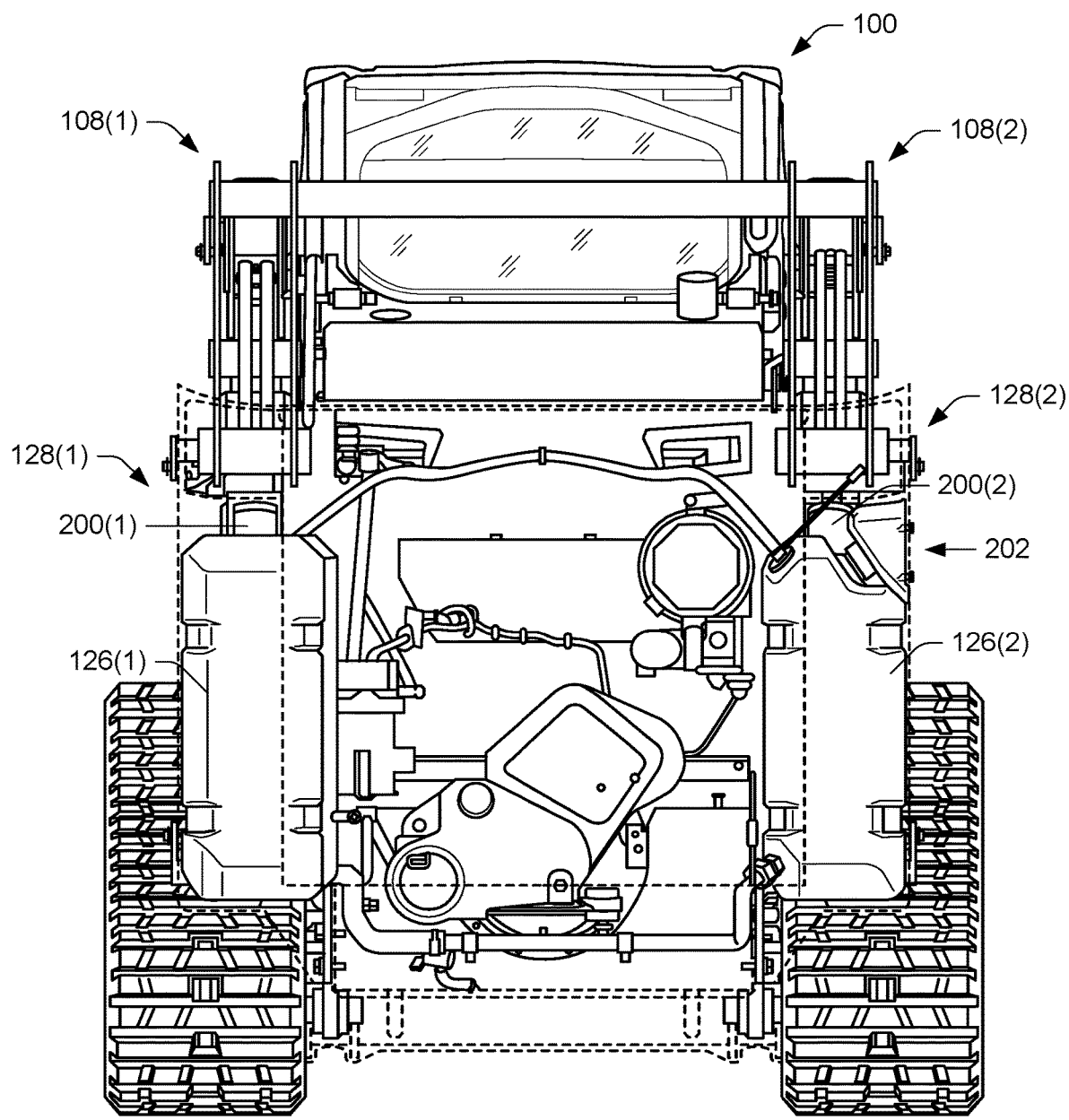
FIG. 2 is a rear elevational view of the machine of FIG. 1, according to an embodiment of the present disclosure.

FIG. 2 illustrates a rear view of the machine 100. Components of the machine 100, such as the door 118, to access the engine compartment 116 are shown as transparent to illustrate components residing therebeneath. Additionally, the first cover 128(1) and the second cover 128(2) are shown as being transparent to illustrate the first fuel tank 126(1) and the second fuel tank 126(2).

As introduced above, the fuel tanks 126 may be respectively aligned with actuators connected to the linkage members 108. For example, a first actuator 200(1) may be connected between the first linkage member 108(1) and the frame 102, and a second actuator 200(2) may be connected between the second linkage member 108(2) and the frame 102. As discussed herein in detail in connection with FIGS. 4 and 6, the actuators 200 and the linkage members 108 may couple to one or more subframes via hinge pins to permit movement of the linkage members 108, and ultimately a work implement (not shown), during actuation of the actuators 200.

The first fuel tank 126(1) and the second fuel tank 126(2) are disposed external to the engine compartment 116, so as to be located in line with the actuators 200, respectively. For example, with reference to the Cartesian Coordinate System of FIG. 2, a portion of the first fuel tank 126(1) may be located in the same Y-Z plane as a portion of the first actuator 200(1) (e.g., intersected by the same Y-Z plane) and a portion of the second fuel tank 126(2) may be located in the same Y-Z plane as a portion of the second actuator 200(2) (e.g., intersected by the same Y-Z plane). In some instances, the first fuel tank 126(1) and the first actuator 200(1) may be horizontally centered with one another, in the X-direction along in the Y-Z plane. Similarly, in some instances, the second fuel tank 126(2) and the second actuator 200(2) may be horizontally centered with one another, in the X-direction along the Y-Z plane. As further shown in FIG. 2, the first fuel tank 126(1) and the second fuel tank 126(2) may be spaced apart from one another, in the X-direction, and on opposing sides of the engine or the machine 100. Additionally, in some instances, the first actuator 200(1) may be located within a width (X-direction) of the first fuel tank 126(1), and/or the second actuator 200(2) may be located within a width (X-direction) of the second fuel tank 126(2).

As further shown in FIG. 2, the second fuel tank 126 may include a spout 202 that permits an operator to fill the fuel tanks 126. The spout 202 is shown located and accessible via a side (e.g., the second side 114(2)) of the machine 100. This may make fueling the machine 100 more convenient for the operator. The operator may fill the fuel tanks 126, via the spout 202, and the fuel may be transferred between the fuel tanks, via a connecting fluid line (discussed in detail in reference to FIGS. 8 and 9). However, although shown as residing on, or being integrated within, the second fuel tank 126(2), the spout 202 may additionally or alternatively be located on the first fuel tank 126(1). Also, the spout 202 is shown as projecting outward from second fuel tank 126(2), but, alternatively, a flush or recessed fill opening could be used instead. The spout 202 may also be located on the rear 120 of the machine 100, and/or within the engine compartment 116.

Therefore, the fuel system 124 includes two separate fuel tanks 126, which are fluidly connected with one another. At least one of the fuel tanks 126 includes the spout 202 for filling the fuel tanks 126. The fuel tanks 126 are located in compartments disposed on opposing sides of the machine 100, which are in line with the linkage members 108 and/or the actuators 200, respectively. By locating the fuel tanks 126 external to the engine compartment 116, the fuel system 124 facilitates a larger total fuel tank volume, a greater usable fuel volume, and access for debris cleanout within the engine compartment 116.

Figure 3:
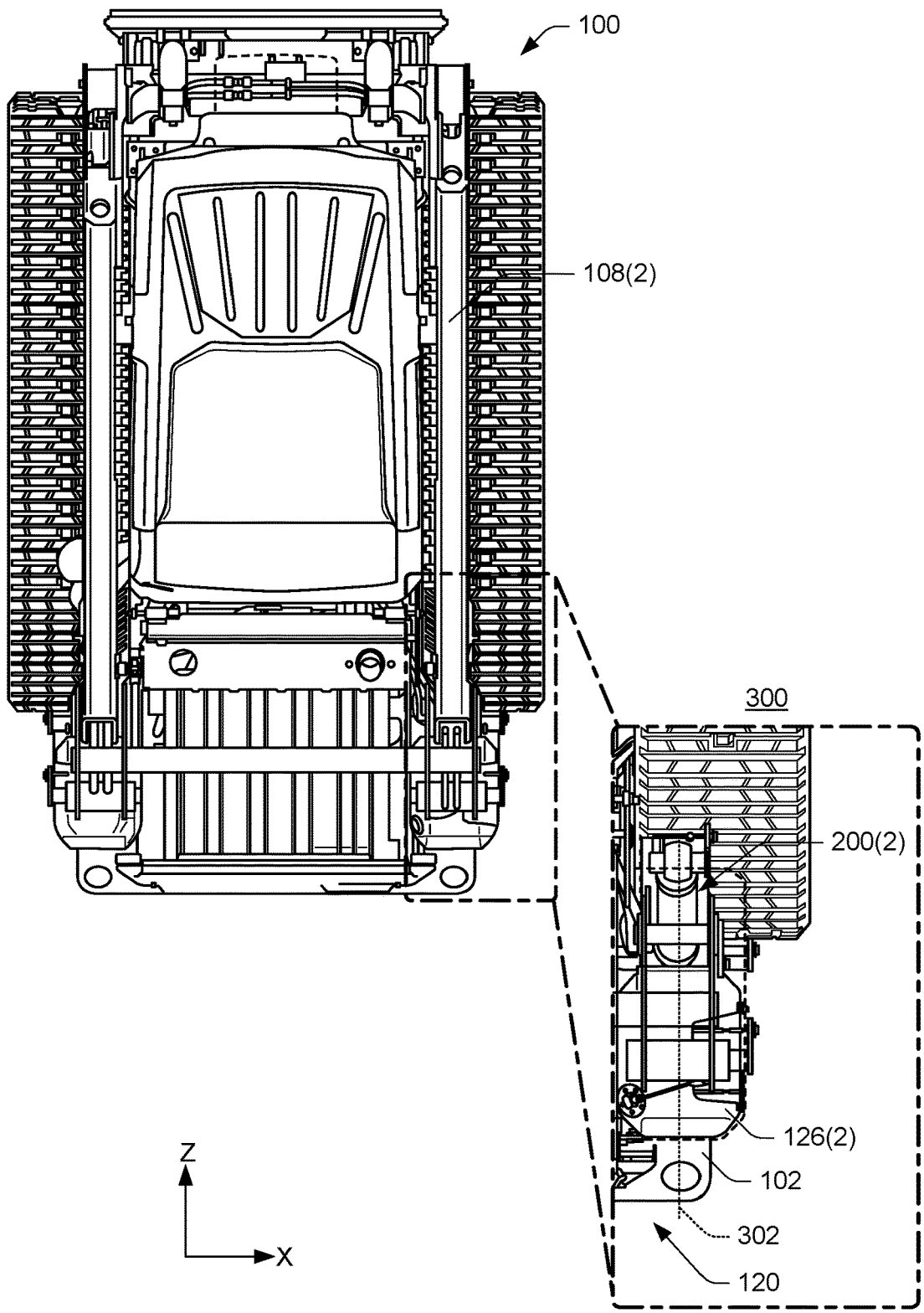
FIG. 3 is a top plan view of the machine of FIG. 1, according to an embodiment of the present disclosure.

FIG. 3 illustrates a detailed view 300 of the machine 100, showing an alignment of the second fuel tank 126(2) and the second actuator 200(2). Although the discussion herein relates to the second fuel tank 126(2) and the second actuator 200(2), it is to be understood that the discussion may be representative of the alignment between the first fuel tank 126(1) and the first actuator 200(1).

Portions of the second linkage member 108(2) are shown as being transparent in the detailed view 300 to illustrate the second actuator 200(2). The second actuator 200(2) extends between the frame 102 (e.g., a bracket coupled to the frame 102) and the second linkage member 108(2). The second actuator 200(2) pivotably connects to the frame 102 and the second linkage member 108(2) via pins, for example, disposed through rod eyes of the second actuator 200(2). Such coupling permits the second actuator 200(2) to rotate (e.g., about the X-axis) during extension and retraction.

Introduced above, the second fuel tank 126(2) and the second actuator 200(2) may be disposed along the same plane, such as a plane 302. The plane 302 may be in the Y-Z plane, in reference to the Cartesian Coordinate System in FIG. 3. In some instances, the second fuel tank 126(2) and the second actuator 200(2) may be horizontally centered (X-direction) on the plane 302. The second fuel tank 126(2) is also shown being disposed between the rear 120 of the machine 100 and the second actuator 200(2). The second fuel tank 126(2) and the second actuator 200(2) may therefore be aligned with one another on the plane 302, or both generally parallel to the plane and offset from one another. In some instances, the second fuel tank 126(2) and the second actuator 200(2) being aligned with one another may indicate that at least a portion of the second fuel tank 126(2) and the second actuator 200(2) horizontally overlap on the plane 302.

Although the discussion is with regard to an alignment between the second fuel tank 126(2) and the second actuator 200(2), in some instances, a compartment housing the second fuel tank 126(2) (or other components of the machine 100) may be aligned with the second actuator 200(2) or the second linkage member 108(2). That is, as compared to conventional approaches that locate the second actuator 200(2) (and other actuators) proximate the rear 120 of the machine 100, the present disclosure contemplates positioning the second actuator 200(2) (and other actuators) forward of conventional positions (e.g., more proximate the rear) to create a useable space on either or both sides of the engine compartment 116. In FIG. 3, the usable space is occupied by the second fuel tank 126(2). However, all or part of the space may be occupied by other components of the machine 100 and/or may represent a storage area, for example, in which supplies are stored.

Therefore, FIG. 3 illustrates that the second fuel tank 126(2) may be located external to the engine compartment 116. The location of the second fuel tank 126(2) external to the engine compartment 116 may increase an ease of access to the fuel tanks 126, respectively. Additionally, disposing the fuel tanks 126 external to the engine compartment 116 may free up space within the engine compartment 116, providing room for other components of the machine 100. For example, the engine may be located lowered towards a bottom of the engine compartment 116, thereby lowering a CoG of the machine 100 and increasing a stability of the machine 100.

Figure 4:
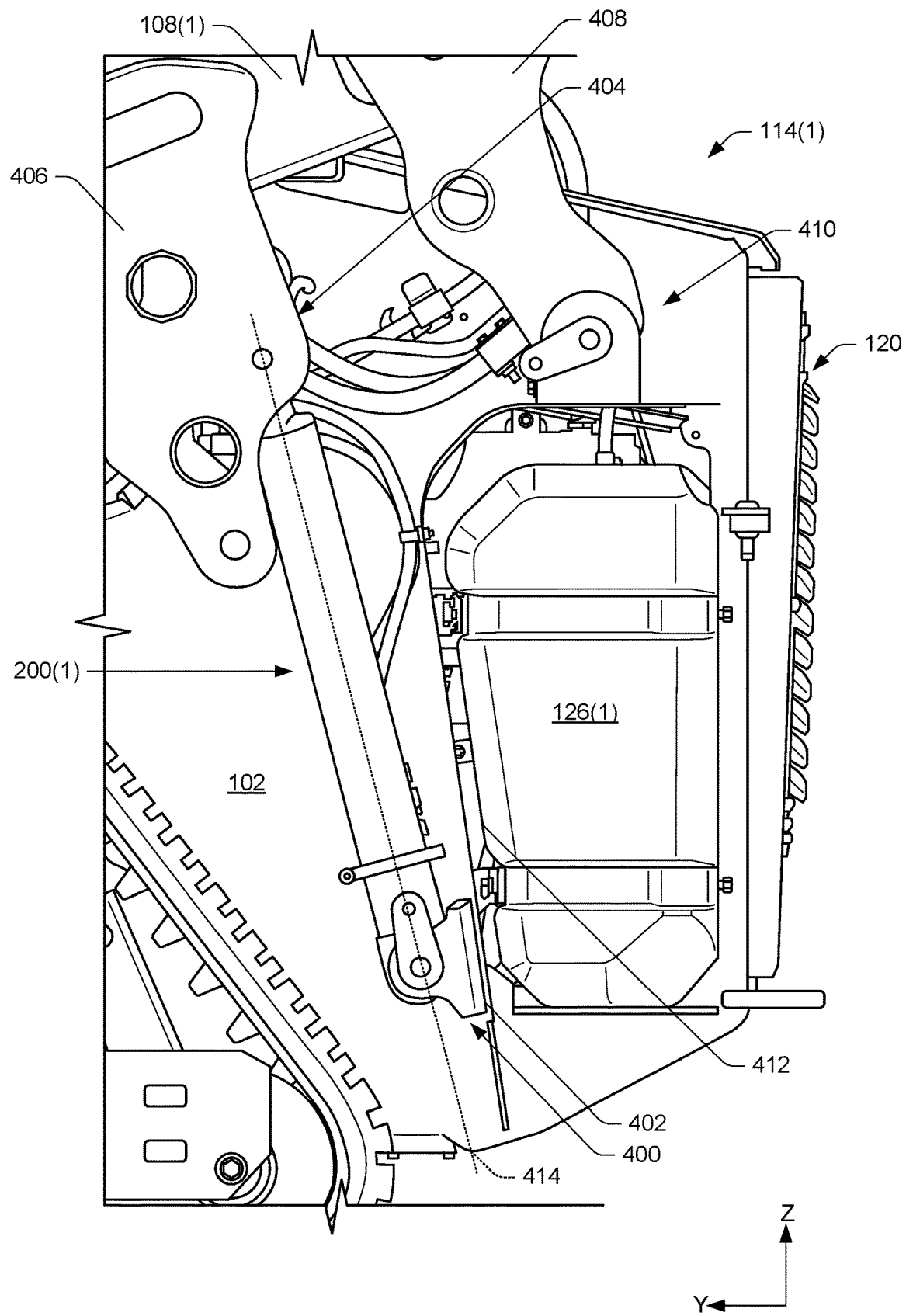
FIG. 4 is a left side view of the machine of FIG. 1, showing a first fuel tank of the machine, according to an embodiment of the present disclosure.

FIG. 4 illustrates a partial side view of the machine 100, such as the first side 114(1) of the machine 100. In FIG. 4, the first cover 128(1) is shown as removed to illustrate the first fuel tank 126(1), the first actuator 200(1), and a coupling of the first actuator 200(1) to the machine 100.

A first end 400 of the first actuator 200(1) is shown coupled to a first bracket 402 on the first side 114(1) of the machine 100. The first bracket 402 may be coupled to the frame 102 or a body of the machine 100. The coupling between the first end 400 and the first bracket 402 provides a first hinge point (e.g., via a pin disposed though a rod eye of the first actuator 200(1)). In doing so, as the first actuator 200(1) extends and retracts, the first end 400 may pivot about the first hinge point (X-axis). A second end 404 of the first actuator 200(1) pivotably couples to a first flange 406. The second end 404 is shown obscured in FIG. 4, behind the first flange 406 (X-direction). The first flange 406 may be coupled to the first linkage member 108(1). The coupling between the second end 404 and the first flange 406 provides a second hinge point (e.g., via a pin disposed though a rod eye of the first actuator 200(1)). In doing so, as the first actuator 200(1) extends and retracts, the second end 404 may pivot about the second hinge point.

The machine 100 is further shown including a first subframe 408. The first subframe 408 may pivotably couple between the first linkage member 108(1) and the frame 102. For example, a first end of the first subframe 408 may couple to a second bracket 410, vertically above the first fuel tank 126(1), while a second end of the first subframe 408 may couple to the first linkage member 108(1). The first subframe 408 may provide structure to the first linkage member 108(1), assist in the movement of the first linkage member 108(1), and/or stabilize the first linkage member 108(1). The first subframe 408 may also couple to the crossbar 112. The machine 100, the first flange 406, and/or the first subframe 408 may include additional hinge points that permit movement of the first linkage member 108(1).

As shown, the first fuel tank 126(1) is disposed behind the first actuator 200(1), between the first actuator 200(1) and the rear 120 of the machine 100. In doing so, the first fuel tank 126(1) is interposed between the first actuator 200(1) and the rear 120 of the machine 100. In some instances, the first fuel tank 126(1) includes a surface 412 that is angled substantially parallel to a longitudinal axis 414 associated with the first actuator 200(1) when positioned as far back as possible toward the rear 120 of the machine 100. As the first actuator 200(1) extends and retracts, so as to raise and lower the first linkage member 108(1), respectively, the first actuator 200(1) (or the longitudinal axis 414) may remain substantially parallel to the surface 412. During actuation of the first actuator 200(1), the first actuator 200(1) may experience rotation about the X-axis. However, the contour and angling of the surface 412, relative to the first actuator 200(1), permits a size of the first fuel tank 126(1) to maximized for the space between the first actuator 200(1) and the rear 120 of the machine 100. In other words, by angling the surface 412 as shown, the first fuel tank 126(1) is able to take advantage of the space between the first actuator 200(1) and the rear 120 of the machine 100 without unwanted contact between first actuator 200(1) and first fuel tank 126(1).

The space occupied by the first fuel tank 126(1) may be provided at least in part by positioning the first actuator 200(1) forward from the rear 120. That is, the first end 400 of the first actuator 200(1) is spaced apart from the rear 120. As such, the first bracket 402 may be located closer to the front 110 of the machine 100 than a bottom of the first fuel tank 126(1). The forward positioning of the first actuator 200(1) limits fore and aft motion as the first actuator 200(1) extends to lift the first linkage member 108(1). As a result, a space is created for positioning the first fuel tank 126(1) external to the engine compartment 116.

FIG. 4 therefore illustrates a positioning of the first fuel tank 126(1) in line with the first actuator 200(1), between the first actuator 200(1) and the rear 120 of the machine 100. This positioning takes advantage of space otherwise unoccupied in conventional approaches, and locates the first fuel tank 126(1) external to the engine compartment 116. For example, conventional approaches may locate the first actuator 200(1) (or other lift mechanism(s)) more proximal to the rear 120 of the machine 100. In such instances, the first fuel tank 126(1) of the machine 100 may not be located in line with the first actuator 200(1) and/or may be forced to be located elsewhere, such as under the engine, within an engine bay, and so forth. Such location(s) increase geometric complexities of the fuel tank(s), reduce an ease of access to the fuel tank(s), and/or raises a CoG of the machine 100. However, the repositioning of the first actuator 200(1) permits the first fuel tank 126(1) to be located coplanarly in the same Y-Z plane as the first actuator 200(1) to address and alleviate such limitations.

Figure 5:
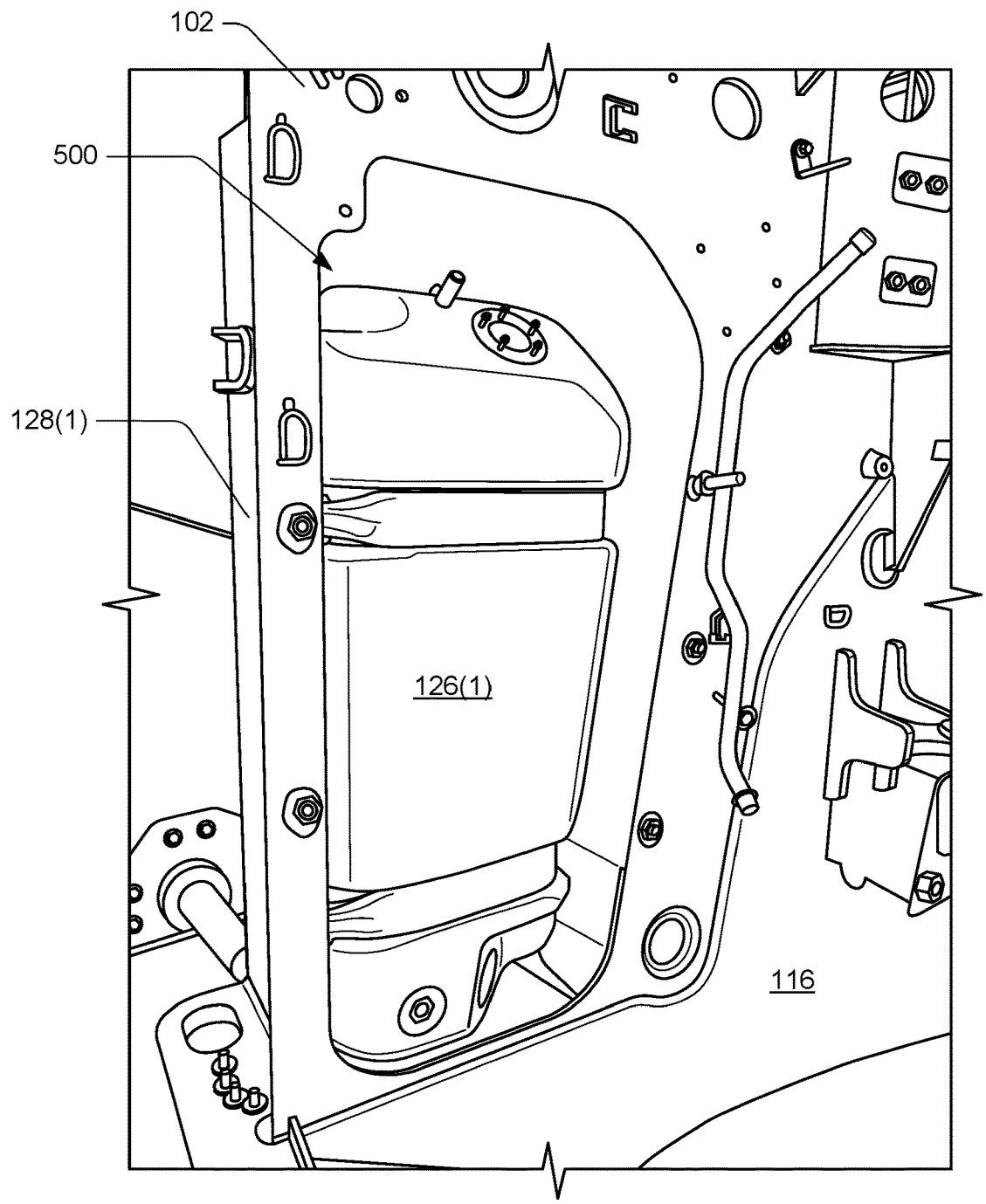
FIG. 5 is a perspective view showing the first fuel tank of the machine, according to an embodiment of the present disclosure.

FIG. 5 illustrates a positioning of the first fuel tank 126(1) within the machine 100 seen from the rear 120 of the machine 100 looking into the engine compartment 116. In FIG. 5, the engine compartment 116 of the machine 100 is shown substantially empty to illustrate the first fuel tank 126(1).

The frame 102, or a body of the machine 100, may define a first compartment 500 within which the first fuel tank 126(1) resides. The first compartment 500 represents a cavity in which the first fuel tank 126(1) is disposed. As shown, the first compartment 500 may be accessible via the engine compartment 116, but may be located external to an area in which the engine resides. In this sense, the first fuel tank 126(1) may be located along a side of the machine 100 (e.g., the first side 114(1)). The first fuel tank 126(1) is internal to the machine 100, within the first compartment 500, meaning that the first fuel tank 126(1) is not on the outside of the machine 100. In some instances, the first compartment 500 may also include similar contour(s) and shape(s) as the first fuel tank 126(1). Moreover, in some instances and as shown, the first fuel tank 126(1) may reside completely within the first compartment 500, so as to not protrude or extend into the engine compartment 116.

The first cover 128(1) may be disposed along the first side 114(1) for concealing, covering, and protecting the first fuel tank 126(1) (e.g., from external impacts and damage). Various bands, straps, fasteners, and the like may secure the first fuel tank 126(1) within the first compartment 500. As shown, and in some instances, a height (Y-direction) of the first fuel tank 126(1) may be greater than a width (X-direction) and/or depth (Z-direction) of the first fuel tank 126(1). In some instances, the first fuel tank 126(1) may have a volume of approximately 50 liters to 75 liters.

In FIG. 5, the first fuel tank 126(1) is therefore positioned external to an area associated with the engine compartment 116. By locating the first fuel tank 126(1) external to the engine compartment 116, so as to not reside within the engine compartment 116, a geometric complexity of the first fuel tank 126(1) may be reduced, the first fuel tank 126(1) may be more easily serviced, and/or space within the engine compartment 116 may be occupied by other components (e.g., pumps, filters, etc.).

Figure 6:
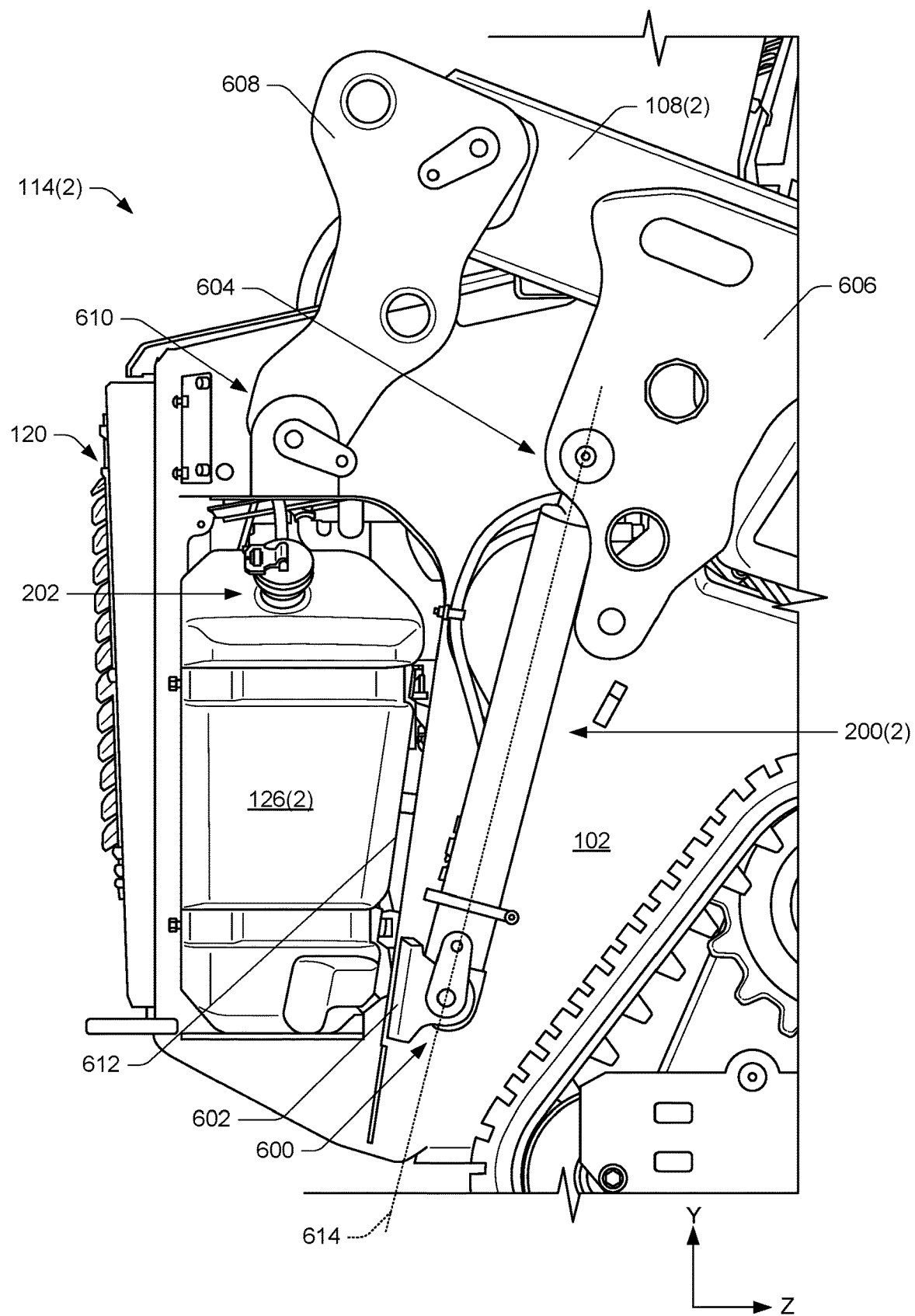
FIG. 6 is a right side view of the machine of FIG. 1, showing a second fuel tank of the machine, according to an embodiment of the present disclosure.

FIG. 6 illustrates a partial side view of the machine 100, such as the second side 114(2) of the machine 100. In FIG. 6, the second cover 128(2) is shown as removed to illustrate the second fuel tank 126(2), the second actuator 200(2), and a coupling of the second actuator 200(2) to the machine 100. The spout 202 is further shown being disposed on the second fuel tank 126(2) for filling the fuel tanks 126. However, the spout 202 may be located on the rear 120 of the machine 100. In such instances, the spout 202 may be accessible on the rear 120, and/or may be accessible within the engine compartment 116, such as opening the door 118.

A first end 600 of the second actuator 200(2) is shown coupled to a third bracket 602 on the second side 114(2) of the machine 100. The third bracket 602 may be coupled to the frame 102 or a body of the machine 100. The coupling between the first end 600 and the third bracket 602 provides a first hinge point (e.g., via a pin disposed though a rod eye of the second actuator 200(2)). In doing so, as the second actuator 200(2) extends and retracts, the first end 600 may pivot about the first hinge point (X-direction). A second end 604 of the second actuator 200(1) pivotably couples to a second flange 606. The second end 604 is shown obscured in FIG. 4, behind the second flange 606 (X-direction). The second flange 606 may be coupled to the second linkage member 108(2). The coupling between the second end 604 and the second flange 606 provides a second hinge point (e.g., via a pin disposed though a rod eye of the second actuator 200(2)). In doing so, as the second actuator 200(2) extends and retracts, the second end 604 may pivot about the second hinge point.

The machine 100 is further shown including a second subframe 608. The second subframe 608 may pivotably couple between the second linkage member 108(2) and the frame 102. For example, a first end of the second subframe 608 may couple to a fourth bracket 610, vertically above the second fuel tank 126(2), while a second end of the second subframe 608 may couple to the second linkage member 108(2). The second subframe 608 may provide structure to the second linkage member 108(2), assist in the movement of the second linkage member 108(2), and/or stabilize the second linkage member 108(2). The second subframe 608 may also couple to the crossbar 112. The machine 100, the second flange 606, and/or the second subframe 608 may include additional hinge points that permit movement of the second linkage member 108(2).

As shown, the second fuel tank 126(2) is disposed behind the second actuator 200(2), between the second actuator 200(2) and the rear 120 of the machine 100. In doing so, the second fuel tank 126(2) is interposed between the second actuator 200(2) and the rear 120 of the machine 100. In some instances, the second fuel tank 126(2) includes a surface 612 that is angled substantially parallel to a longitudinal axis 614 associated with the second actuator 200(2) when positioned as far back as possible toward the rear 120 of the machine 100. As the second actuator 200(2) extends and retracts, so as to raise and lower the second linkage member 108(2), respectively, the second actuator 200(2) (or the longitudinal axis 614) may remain substantially parallel to the surface 612. During actuation of the second actuator 200(2), the second actuator 200(2) may experience rotation about the X-axis. However, the contour and angling of the surface 612, relative to the second actuator 200(2), permits a size of the second fuel tank 126(2) to maximize for the space between the second actuator 200(2) and the rear 120 of the machine 100. In other words, by angling the surface 612 as shown, the second fuel tank 126(2) is able to take advantage of the space between the second actuator 200(2) and the rear 120 of the machine 100 without unwanted contact between the first actuator 200(1) and the first fuel tank 126(1).

The space occupied by the second fuel tank 126(2) may be provided at least in part by positioning the second actuator 200(2) forward from the rear 120. That is, the first end 600 of the second actuator 200(2) is spaced apart from the rear 120. As such, the third bracket 602 may be located closer to the front 110 of the machine 100 than a bottom of the second fuel tank 126(2). The forward positioning of the second actuator 200(2) limits fore and aft motion as the second actuator 200(2) extends to lift the second linkage member 108(2). As a result, a space is created for positioning the second fuel tank 126(2) external to the engine compartment 116.

FIG. 6 therefore illustrates a positioning of the second fuel tank 126(2) in line with the second actuator 200(2), between the second actuator 200(2) and the rear 120 of the machine 100. This positioning takes advantage of space otherwise unoccupied in conventional approaches, and locates the second fuel tank 126(2) external to the engine compartment 116. For example, conventional approaches may locate the second actuator 200(2) (or other lift mechanism(s)) more proximal to the rear 120 of the machine 100. In such instances, the second fuel tank 126(2) of the machine 100 may not be located in line with the second actuator 200(2) and/or may be forced to be located elsewhere, such as under the engine, within an engine bay, and so forth. Such location(s) increase geometric complexities of the fuel tank(s), reduce an ease of access to the fuel tank(s), and/or raises a CoG of the machine 100. However, the repositioning of the second actuator 200(2) permits the second fuel tank 126(2) to be located coplanarly in the same Y-Z plane as the second actuator 200(2) to address and alleviate such limitations.

Figure 7:
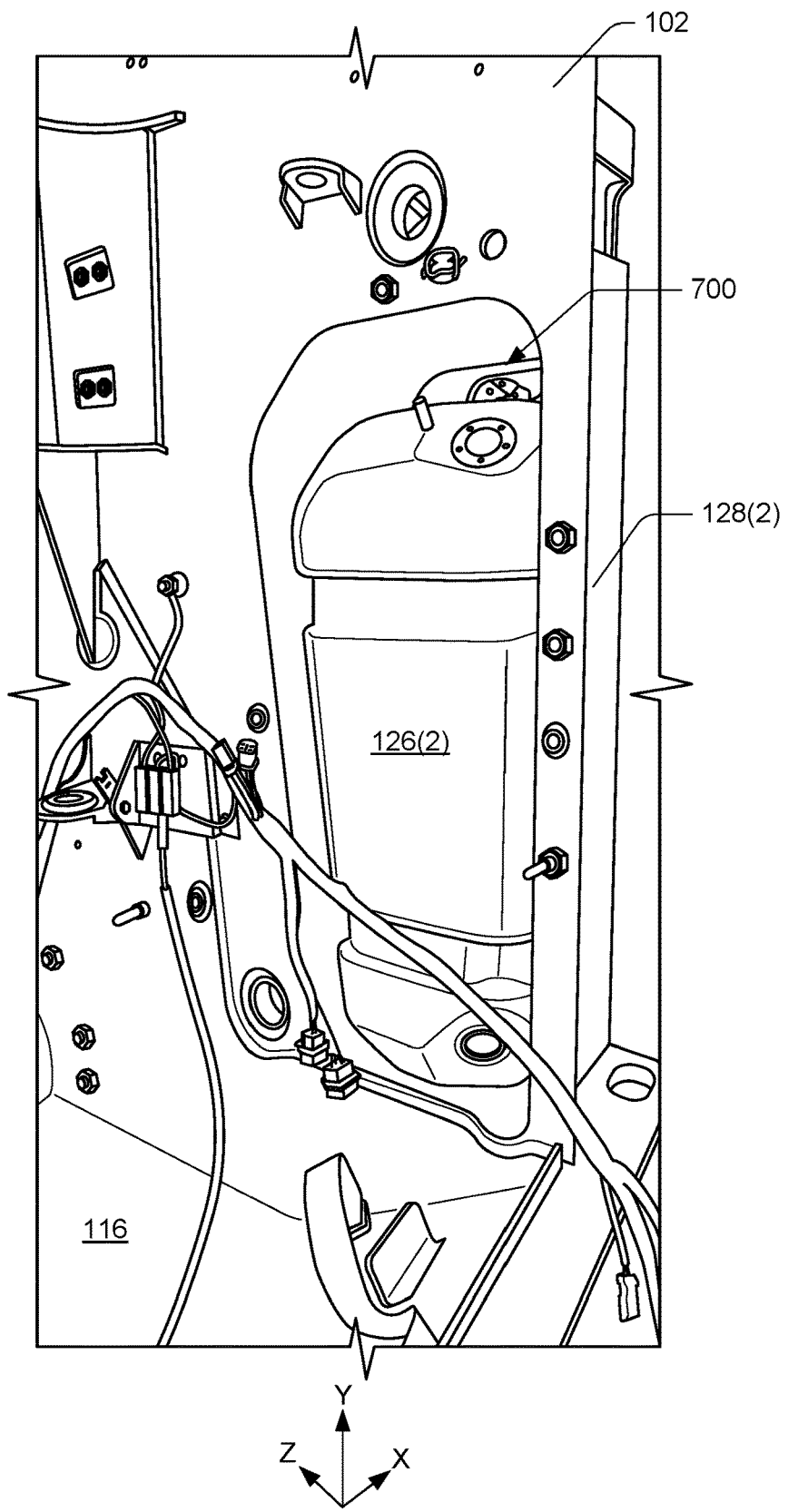
FIG. 7 is a perspective view showing the second fuel tank of the machine, according to an embodiment of the present disclosure.

FIG. 7 illustrates a positioning of the second fuel tank 126(2) within the machine 100 from the rear 120 of the machine 100 looking into the engine compartment 116. In FIG. 7, the engine compartment 116 of the machine 100 is shown substantially empty to illustrate the second fuel tank 126(2).

The frame 102, or a body of the machine 100, may define a second compartment 700 within which the second fuel tank 126(2) resides. The second compartment 700 represents a cavity in which the second fuel tank 126(2) is disposed. As shown, the second compartment 700 may be accessible via the engine compartment 116, but may be located external to an area in which the engine resides. In this sense, the second fuel tank 126(2) may be located along a side of the machine 100 (e.g., the second side 114(2)). The second fuel tank 126(2) is internal to the machine 100, within the second compartment 700, meaning that the second fuel tank 126(2) is not on the outside of the machine 100. In some instances, the second compartment 700 may also include similar contour(s) and shape(s) as the second fuel tank 126(2). Moreover, in some instances and as shown, the second fuel tank 126(2) may reside completely within the second compartment 700, so as to not protrude or extend into the engine compartment 116.

The second cover 128(2) may be disposed along the second side 114(2) for concealing, covering, and protecting the second fuel tank 126(2) (e.g., from external impacts and damage). Various bands, straps, fasteners, and the like may secure the second fuel tank 126(2) within the second compartment 700. As shown, and in some instances, a height (Y-direction) of the second fuel tank 126(2) may be greater than a width (X-direction) and/or depth (Z-direction) of the second fuel tank 126(2). In some instances, the second fuel tank 126(2) may have a volume of approximately 40 liters to 80 liters.

In FIG. 7, the second fuel tank 126(2) is therefore positioned external to an area associated with the engine compartment 116. By locating the second fuel tank 126(2) external to the engine compartment 116, so as to not reside within the engine compartment 116, a geometric complexity of the second fuel tank 126(2) may be reduced, the second fuel tank 126(2) may be more easily serviced, and/or space within the engine compartment 116 may be occupied by other components (e.g., pumps, filters, etc.).

Figure 8:
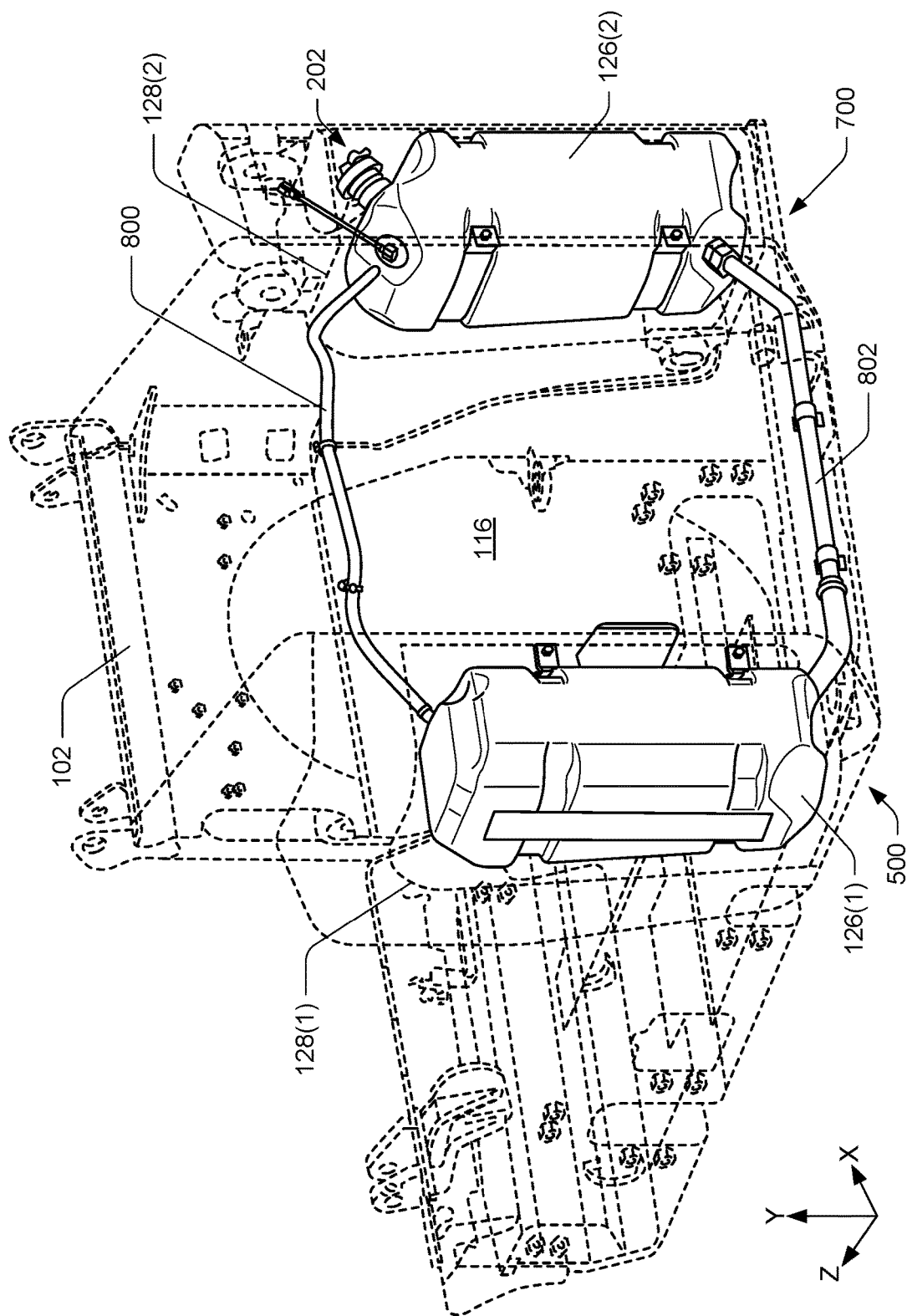
FIG. 8 is a rear perspective view of the machine of FIG. 1, showing the dual fuel tank system, according to an embodiment of the present disclosure.

FIG. 8 illustrates the fuel tanks 126 disposed within the frame 102. In FIG. 8, the frame 102 is shown as being transparent to illustrate the positions of the fuel tanks 126 on the machine 100. As introduced above, the first fuel tank 126(1) and the second fuel tank 126(2) may be disposed in compartments, accessible via but external to the engine compartment 116. For example, the first fuel tank 126(1) may be disposed in the first compartment 500 and the second fuel tank 126(2) may be disposed with the second compartment 700. The first compartment 500 and the second compartment 700 are provided, at least in part, via a positioning of the first actuator 200(1) and the second actuator 200(2) spaced forwardly apart from the rear 120 of the machine 100 (as shown and discussed in FIGS. 4 and 6, respectively).

Although the discussion herein relates to the first fuel tank 126(1) and the second fuel tank 126(2) being disposed within the first compartment 500 and the second compartment 700, respectively, other components may additionally or alternatively reside within the first compartment 500 and/or the second compartment 700. The first fuel tank 126(1) and the second fuel tank 126(2) may be secured within the first compartment 500 and the second compartment 700, respectively, via support plates, brackets, and the like. As an example, the machine 100 may, in some instances, include a single fuel tank located within one of the first compartment 500 or the second compartment 700. The other of the first compartment 500 or the second compartment 700 may house batteries, pumps, tool box(es), electronics, filters, fire extinguisher(s), fluid reservoir(s) (e.g., power steering), coolant recovery, and so forth. More generally, the first compartment 500 and the second compartment 700 may provide additional space in which components of the machine 100 are located. In some instances, the first compartment 500 and/or the second compartment 700 may represent a storage area of the machine 100. For example, the first compartment 500 and/or the second compartment 700 may store gloves, operator manuals, supplies, and so forth. In some instances, the machine 100 may only include one of the first compartment 500 or the second compartment 700.

The frame 102 therefore provides the first compartment 500 and the second compartment 700 for the first fuel tank 126(1) and the second fuel tank 126(2), respectively. However, as noted above, the first compartment 500 and/or the second compartment 700 may receive, or house, other components. As such, the first compartment 500 and the second compartment 700 provide storage area(s) in which components (e.g., battery) may be located. This additional storage area may reduce a number of components located within the engine compartment 116, so as to make servicing the engine more accessible and/or lower a CoG of the machine 100 (e.g., by lowering the engine within the engine compartment 116).

The fuel tanks 126 may be fluidly connected to one another via various hoses or fluid lines. For example, a first fluid line 800 may fluidly couple between the first fuel tank 126(1) and the second fuel tank 126(2). In some instances, and as shown in FIG. 8, the first fluid line 800 may extend between a top portion of the first fuel tank 126(1) and a top portion of the second fuel tank 126(2). The first fluid line 800 may represent a vent line that fluidly connects the first fuel tank 126(1) and the second fuel tank 126(2). The first fluid line 800 may represent a fluid release component that permits air to exit the first fuel tank 126(1) and/or the second fuel tank 126(2) during refueling or to vent vapors. In some instances, each of the first fuel tank 126(1) and the second fuel tank 126(2) may include a respective fluid release components that permits the first fuel tank 126(1) and the second fuel tank 126(2) to breath to an ambient environment. That is, the first fuel tank 126(1) and the second fuel tank 126(2) need not be fluidly connected together via the first fluid line 800. In some instances, the first fluid line 800 may include a flexible hose, a rigid pipe, and/or any combination thereof.

A second fluid line 802 is shown extending between a bottom portion of the first fuel tank 126(1) and a bottom portion of the second fuel tank 126(2). The second fluid line 802 may represent a supply line that fluidly connects the first fuel tank 126(1) and the second fuel tank 126(2). For example, as fuel enters the second fuel tank 126(2), via the spout 202, fuel may flow from the second fuel tank 126(2) to the first fuel tank 126(1), so as to fill both the first fuel tank 126(1) and the second fuel tank 126(2). During such filling, air inside the second fuel tank 126(2) displaced by the inflowing fuel can escape through first fluid line 800 to the first fuel tank 126(1). Moreover, as the machine 100 traverses uneven terrain, the second fluid line 802 may transfer fuel between the higher and lower of the first fuel tank 126(1) and the second fuel tank 126(2). For example, it is envisioned that during operation of the machine 100, the second fluid line 802 acts to balance and equalize a level of fuel present in the first fuel tank 126(1) and the second fuel tank 126(2). In some instances, the second fluid line 802 may include a flexible hose, a rigid pipe, and/or any combinations thereof Moreover, in some instances, the fuel system 124 may include a manifold that receives fluid from both of the first fuel tank 126(1) and the second fuel tank 126(2). For example, a fluid line may route fuel from the first fuel tank 126(1) to the manifold, and another fluid line may route fuel from the second fuel tank 126(2) to the manifold. Therein, a pump fluidly connected to the manifold may draw fuel for transferring to the engine.

Such design may be in comparison to conventional approaches whereby the fuel tanks are short in the vertical direction but wide in horizontal directions. However, such design is less than ideal when operating in varying terrain at low fuel volumes. For example, if the machine is oriented at an angle due to the terrain, the fuel shifts to the lowest point which may cause the fuel pick-up location to be above the fuel level. Rather, the fuel tanks 126 may be taller in the vertical direction to avoid the fuel pick-up location lacking fuel.

Figure 9:
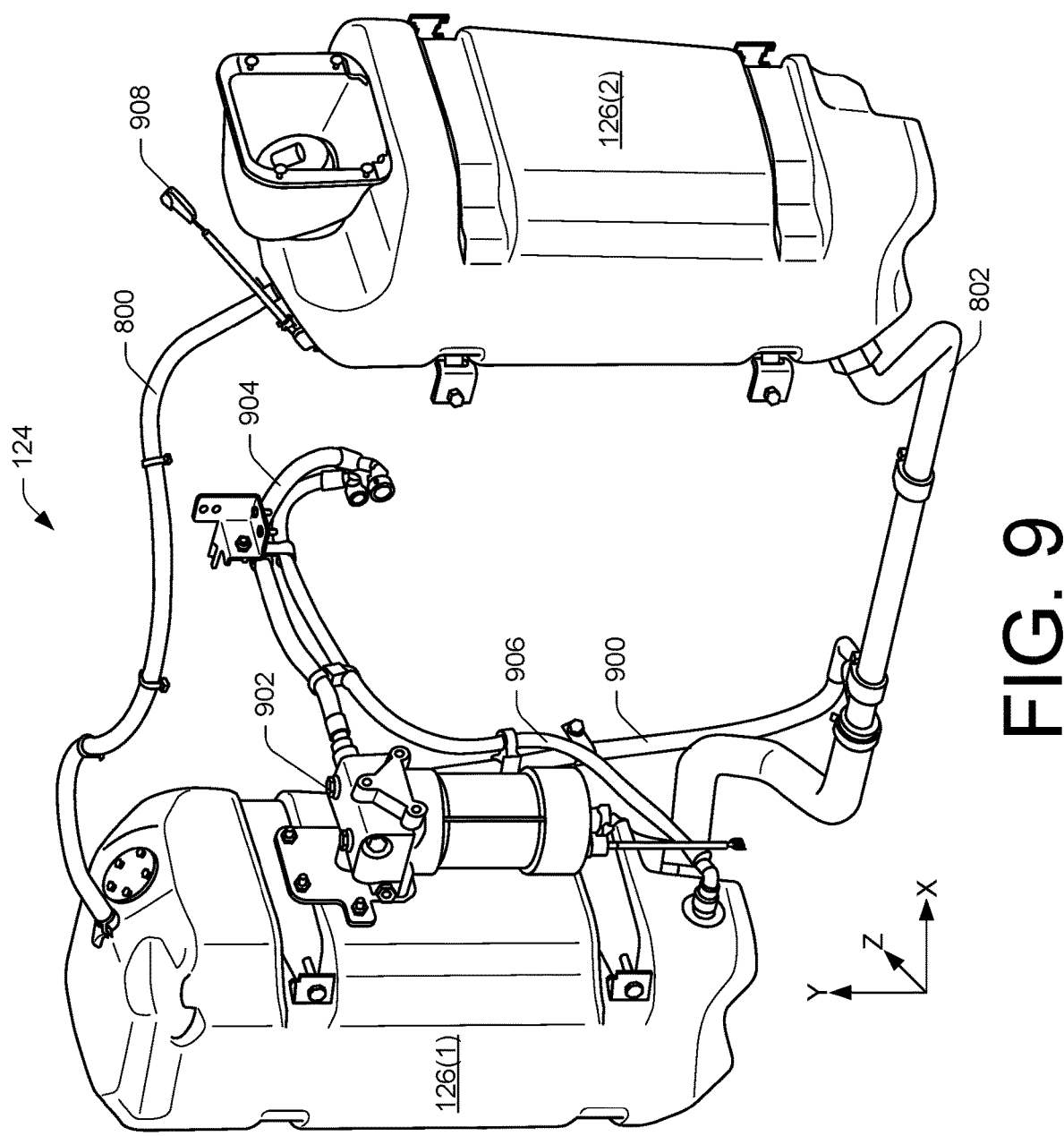
FIG. 9 is a perspective view of the dual fuel tank system, according to an embodiment of the present disclosure.

As discussed in more detail in regard to FIG. 9, a fuel pump may draw fuel from the second fluid line 802. Being as the second fluid line 802 extends below the bottoms of the first fuel tank 126(1) and the second fuel tank 126(2), the second fluid line 802 may represent a lowest vertical point on the fuel system 124 for pumping fuel to the engine. In some instances, the first fluid line 800 and/or the second fluid line 802 may route between the first fuel tank 126(1) and the second fuel tank 126(2), within the engine compartment 116.

FIG. 9 illustrates components of the fuel system 124. As introduced above, the first fuel tank 126(1) and the second fuel tank 126(2) may be fluidly connected via the first fluid line 800 and the second fluid line 802. A third fluid line 900 fluidly connects the second fluid line 802 to a fuel pump 902. As shown, the third fluid line 900 fluidly couples to the second fluid line 802, at a low point of the fuel system 124, for permitting fuel to be drawn in by the fuel pump 902. The fuel pump 902 may couple to the first fuel tank 126(1) and may be electrically connected to power sources (e.g., battery or electrical system) of the machine 100 for supplying fuel to the engine. A fourth fluid line 904 may route fuel from the fuel pump 902 to the engine, and a fifth fluid line 906 may represent a return fuel line that routes excess fuel back into the first fuel tank 126(1).

The fuel system 124 further includes a sensor 908 coupled to the second fuel tank 126(2). The sensor 908 may represent a float gauge utilized to measure a fuel level within the fuel system 124. The sensor 908 is configured to provide a signal indicative of a level of fuel present within the fuel tanks 126 to a controller (or other electronics of the machine 100) that are communicatively coupled to the sensor 908. For example, the controller is configured to receive the signal from the sensor, determine a level of fuel in the fuel tanks 126, and deliver a signal indicative of the level of fuel to a display device in the operator cabin 106.

The fuel system 124 may include additional components not illustrated or discussed, such as multiple fuel pump(s), filter(s), shut-off valves, hoses, fluid lines, and the like. The fluid lines and/or components of the fuel system 124 may also be different than shown. For example, the fuel pump 902 may couple to the second fuel tank 126(2). Additionally, the fluid lines may be routed differently than shown. The first fuel tank 126(1), may include the sensor 908, or another sensor, as well as a spout for filling the fuel tanks 126.

The fuel system 124 includes components for routing fuel between the first fuel tank 126(1) and the second fuel tank 126(2) disposed on opposing sides of the machine 100. The positioning of the first fuel tank 126(1) and the second fuel tank 126(2) may free up space within the engine compartment 116, and the various fluid lines permits the fuel system 124 to consistently provide fuel in such design, and from/between the two fuel tanks.

Industrial Applicability

Examples of the present disclosure include fuel systems 124 having a plurality of fuel tanks 126 located on opposing sides of an engine compartment 116. Such fuel systems 124 reduce the complexity of existing dual fuel tank systems, increase the amount of usable space available within the engine compartment 116, and lower a CoG of the machine 100 with which the fuel systems 124 are employed. Additionally, the fuel tanks 126 provide the machine 100 with an increased fuel capacity, and increase the ease with which the fuel tanks 126 may be filled.

More particularly, the fuel system 124 may utilize space disposed behind actuators 200 of the machine 100 that is otherwise unused. For example, a first compartment 500 may be located between a first actuator 200(1) and a rear 120 of the machine 100, and a second compartment 700 may be located between a second actuator 200(2) and the rear 120 of the machine 100. The first compartment 500 and the second compartment 700 may be located on opposing sides of the machine 100, external to the engine compartment 116, but accessible via the engine compartment 116. The first fuel tank 126(1) and the second fuel tank 126(2) may be disposed in the first compartment 500 and the second compartment 700, respectively. In doing so, the first actuator 200(1) is located in line (or intersected by a same plane) as the first fuel tank 126(1), and the second actuator 200(2) is located in line (or intersected by a same plane) as the second fuel tank 126(2). Positioning the first fuel tank 126(1) and the second fuel tank 126(2) external to the engine compartment 116 frees up space within the engine compartment and permits the engine to be lowered on the machine 100, thereby lowering a CoG and increasing a stability of the machine 100. Covers 128 protect the fuel tanks 126 from damage.

Additionally, given the location of the first fuel tank 126(1) and the second fuel tank 126(2), the geometric complexities (e.g., shape) of the first fuel tank 126(1) and the second fuel tank 126(2) may be reduced. This may reduce manufacturing costs and increase a fuel capacity of the machine 100. Further, the shapes of the first fuel tank 126(1) and the second fuel tank 126(2) can be chosen to provide a continuous fuel supply in instances where the machine 100 is traveling on uneven terrain, and/or when the fuel supply is lowered. Locating the first fuel tank 126(1) and the second fuel tank 126(2) external to the engine compartment also permits the fuel system 124 to be conveniently refilled without opening doors.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A fuel system, comprising:
a first fuel tank configured to reside within a first compartment of a machine, the first fuel tank having a first width that extends between a first side and a second side of the first fuel tank, wherein a first end and a second end of a first actuator of the machine reside within the first width;
a second fuel tank configured to reside within a second compartment of the machine, the second fuel tank having a second width that extends between a first side and a second side of the second fuel tank, wherein a first end and a second end of the second actuator of the machine reside within the second width;
a fluid release component fluidly connected to at least one of a top portion of the first fuel tank or a top portion of the second fuel tank, the fluid release component being configured to vent fluid within the at least one of the first fuel tank or the second fuel tank; and
a fluid line fluidly connecting a bottom portion of the first fuel tank with a bottom portion of the second fuel tank, the fluid line being configured to transfer fuel between the first fuel tank and the second fuel tank.

2. The fuel system of claim 1, wherein:
the first actuator connects to a first linkage member of the machine; and
the second actuator connects to a second linkage member of the machine.

3. The fuel system of claim 2, wherein:
a first vertical plane extends substantially parallel along a first side of the machine;
a second vertical plane extends substantially parallel along a second side of the machine;
the first vertical plane extends through the first fuel tank, the first actuator, and the first linkage member; and
the second vertical plane extends through the second fuel tank, the second actuator, and the second linkage member.

4. The fuel system of claim 1, wherein:
the first fuel tank includes a first height that is greater than at least one of a first width or a first depth of the first fuel tank; and
the second fuel tank includes a second height that is greater than at least one of a second width or a second depth of the second fuel tank.

5. The fuel system of claim 1, wherein at least a portion of the first fuel tank and at least a portion of the second fuel tank reside external to an engine compartment of the machine.

6. The fuel system of claim 1, wherein:
the first fuel tank is located on a first side of the machine; and
the second fuel tank is located on a second side of the machine, opposite the first side of the machine.

7. The fuel system of claim 1, further comprising a refueling spout located on the second fuel tank, along one of a side of the machine or the rear of the machine.

8. A machine, comprising:
an engine compartment;
an engine located at least partially within the engine compartment;
a first compartment located on a first side of the machine, the first compartment including:
a first inner side, and
a first outer side opposite the first inner side;
a second compartment located on a second side of the machine, the second compartment including:
a second inner side, and
a second outer side opposite the second inner side;
a first actuator disposed on the first side of the machine, the first actuator including:
a first end coupled to a first linkage member configured to support a work implement, and
a second end coupled to a first bracket, wherein the first inner side of the first compartment is located closer to the engine compartment than the first bracket;
a second actuator disposed on the second side of the machine, the second actuator including:
a third end coupled to a second linkage member configured to support the work implement, and
a fourth end coupled to a second bracket, wherein the second inner side of the second compartment is located closer to the engine compartment than the second bracket;
a first fuel tank located at least partially within the first compartment; and
a second fuel tank located at least partially within the second compartment.

9. The machine of claim 8, further comprising:
a first fluid line fluidly connecting a top of the first fuel tank and a top of the second fuel tank; and
a second fluid line fluidly connecting a bottom of the first fuel tank and a bottom of the second fuel tank.

10. The machine of claim 8, wherein at least one of the first fuel tank or the second fuel tank includes an inlet, the inlet being accessible on at least one of:
the first side of the machine;
the second side of the machine; or
a rear of the machine.

11. The machine of claim 8, wherein at least one of:
the first fuel tank includes a first height that is greater than at least one of a first width or a first depth of the fuel first tank; or
the second fuel tank includes a second height that is greater than at least one of a second width or a second depth of the second fuel tank.

12. The machine of claim 8, wherein:
the first fuel tank is disposed between the first actuator and a rear of the machine; and
the second fuel tank is disposed between the second actuator and the rear of the machine.

13. The machine of claim 8, further comprising:
a first cover coupled to the first side of the machine, the first cover at least partially enclosing the first fuel tank and at least partially enclosing the first actuator; and
a second cover coupled to the second side of the machine, the second cover at least partially enclosing the second fuel tank and at least partially enclosing the second actuator.

14. A machine, comprising:
an engine compartment;
an actuator having a first end coupled to a frame of the machine and second end coupled to a linkage member configured to support a work implement, wherein a plane extends through the first end and the second end of the actuator;
a compartment located on a side of the engine compartment, along the plane, and interposed between the actuator and a rear of the machine; and
a component at least partially disposed within the compartment and along the plane.

15. The machine of claim 14, wherein the component comprises at least one of a battery, a pump, a fuel tank, an air filter, an oil filter, or a tool box.

16. The machine of claim 14, wherein an entirety of the component resides within the compartment.

17. The machine of claim 14, wherein the compartment comprises a first compartment, the actuator comprises a first actuator, the linkage member comprises a first linkage member, the side comprises a first side, and the plane comprises a first plane, the machine further comprising:
- a second actuator having a third end coupled to the frame of the machine and a fourth end coupled to a second linkage member configured to support the work implement, wherein a second plane extends through the third end and the fourth end of the second actuator; and
- a second compartment located on a second side of the engine compartment, opposite the first side of the engine compartment, along the second plane.

18. The machine of claim 17, wherein the component comprises a first fuel tank, the machine further comprising a second fuel tank disposed at least partially within the second compartment, the first fuel tank and the second fuel tank being fluidly connected to one another.

19. The machine of claim 14, wherein:
- the compartment is spaced apart from the engine compartment in a direction by a first distance; and
- the actuator is spaced apart from the engine compartment in the direction by a second distance, the second distance being greater than the first distance.

20. The machine of claim 14, wherein the compartment is accessible via the engine compartment.

\* \* \* \* \*